3,191,221
ARRANGEMENT FOR REMOVING OIL SACS
FROM FOWL
Hoyt O. Kesler, 2125 Skyline Drive NE., and Henderson
Steele, P.O. Box 707, both of Gainesville, Ga.
Filed July 8, 1963, Ser. No. 293,436
12 Claims. (Cl. 17—11)

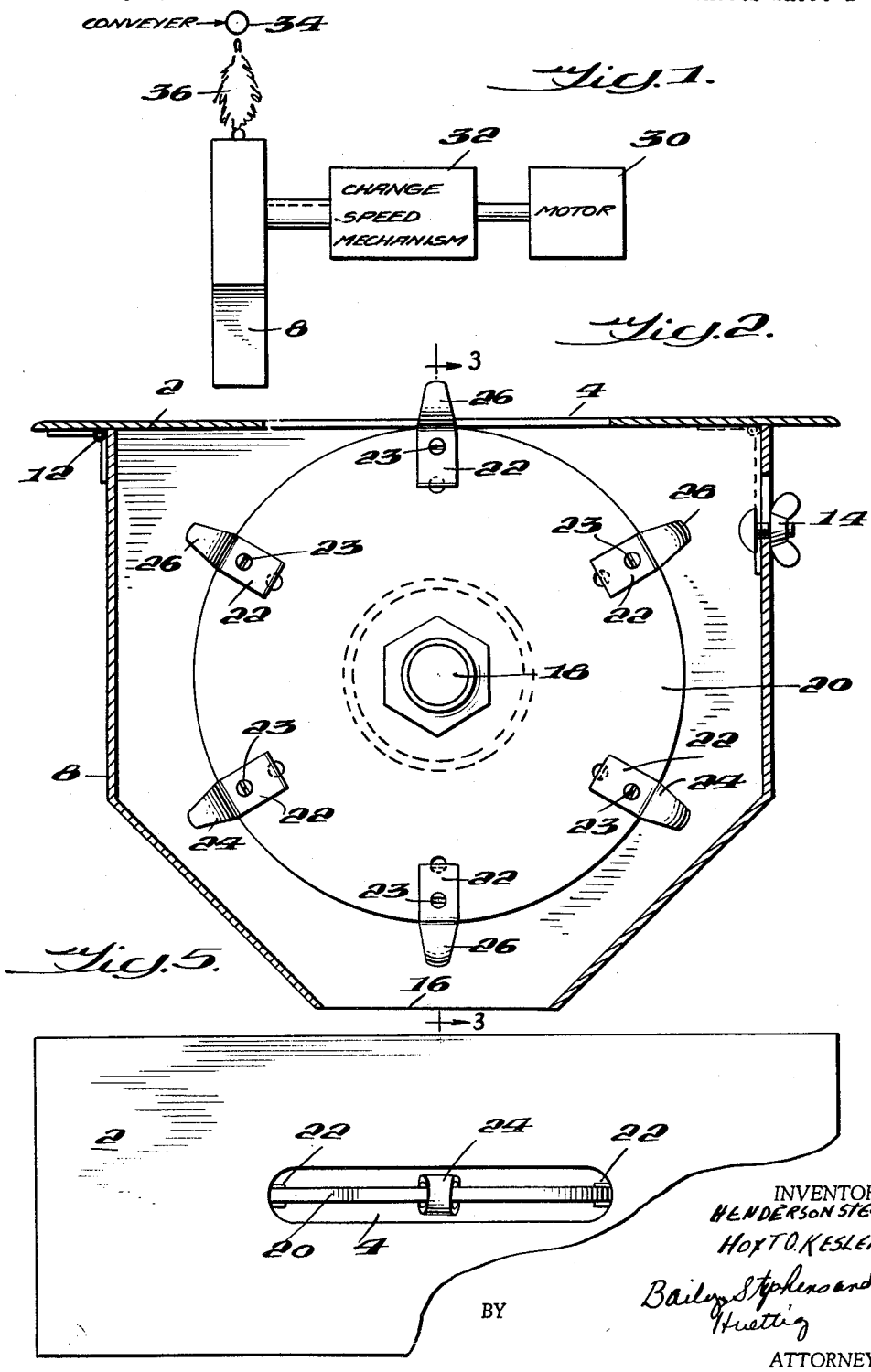

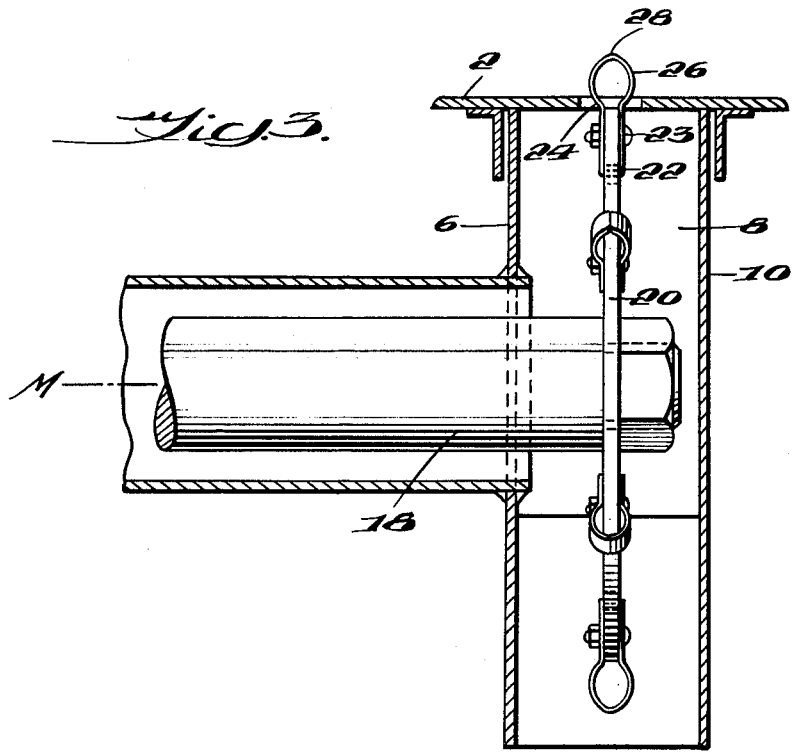
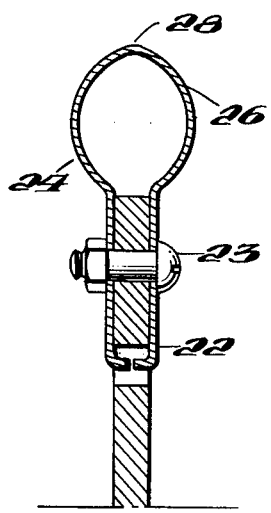
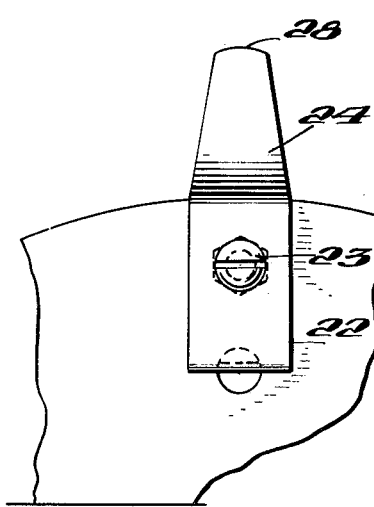
INVENTORS
HENDERSON STEELE
HOYT O. KESLER
ATTORNEYS

United States Patent Office 3,191,221
Patented June 29, 1965

The invention relates to an arrangement for removing the oil sac from fowl carcasses, and especially from chicken carcasses.

There is a small gland on the rump of the poultry bird which generates oil and is not allowed to remain in the carcass of the chicken. At present, the practice is to remove this oil sac by hand operations.

The primary object of the present invention is to provide a machine of simple and inexpensive construction for removing the oil sac. Such a machine has a number of advantages.

The first advantage is that the small gland is excised from the carcass of the bird with very little waste of meat and, in an operation where as many as 50,000 birds per day are dressed, there will be a saving of approximately 200 pounds of meat that would otherwise go as waste if the oil gland is removed manually under the present method of performing this operation. This saving of meat can result in considerable savings of money in direct proportion to what the price of dressed poultry may be at the time.

Second the use of the oil-sac remover machine will eliminate the services and salaries of two people in the average poultry plant which will result in the saving of a substantial amount to the user of the machine.

The machine is susceptible of mass production and can be supplied at a reasonable cost to processors of poultry and will result in extensive savings over an extended period of time. As a matter of fact, the machine should far more than pay for itself in a relatively short time.

The machine consists of a disk driven by a motor and on the disk are a number of blades. The blades have an oval or U shape that will facilitate the excising of the oil gland.

The disc is mounted in a casing having a slot in one wall through which the blades pass when the disc is rotated, and the conveyer which carries the fowl is arranged to pass the rear ends of the fowl in a path close to the path of the knives so that the fowl can be guided by an operator to a position where one of the knives will cut out the gland.

Further objects and advantages of the invention will appear more fully from the following description, especially when taken in conjunction with the accompanying drawings which form a part thereof.

In the drawings:

FIG. 1 shows schematically the device and its relation to a chicken conveyor;

FIG. 2 is a vertical cross-section through a device embodying the invention;

FIG. 3 is a cross-section on the line 3—3 of FIG. 2;

FIG. 4 is an enlarged sectional view of one of the knives of FIG. 3;

FIG. 5 is a plan view of the casing wall with parts broken away; and

FIG. 6 is a side view of the knife of FIG. 4.

The device is enclosed in a casing having one wall 2 provided with an elongated slot 4. The casing has a fixed sidewall 6. It also has end walls 8 and a second sidewall 10 connected as a unit to swing about a hinge 12 and to be held in position by a securing device 14. The casing has a discharge opening 16 at the bottom.

Shaft 18 extends into the casing through wall 6 and carries inside the casing a disc 20. The longitudinal axis of slot 4 is in a plane perpendicular to the shaft axis. The diameter of disc 20 is substantially equal to the distance from the shaft axis to wall 2.

A plurality of knives are carried by disc 20. Each knife is formed of one piece of metal and has legs 22 secured on opposite faces of the edge portion of the disc by bolts 23, outwardly bent parts 24 and inwardly bent parts 26 coming together at 28. Parts 26 are preferably parts of ovals which meet in a slight point at 28. The knives are slightly narrower than slot 4.

It will be clear (FIG. 2) that, as the disc rotates, the outer portions 26 of successive knives will move out through slot 4 and can engage and excise the oil sac of a fowl held in the proper position by an operator. In the case of a machine for operating on chickens, the width of the knife is about half an inch. The knife is sharpened at both edges.

Referring to FIG. 1, the device is shown as driven by a motor 30 through a variable speed transmission 32. A conventional conveyer 34 carries chickens 36 in a path so that their rear ends pass close to the path of the knives outside the casing.

The blades operate either in a counterclockwise motion or clockwise motion as desired. This arrangement is to facilitate use in various types of dressing plant operations. In some operations, the birds hang from the shackles on the moving line by the feet and in others the birds hang from the shackles by the head. By adjusting of the oil-sac remover machine to operate in clockwise or counterclockwise movement, the device is adaptable to either type of chain over which poultry moves and adaptable to the method of hanging the poultry of the machine.

By virtue of the variable speed or gear adjustment it is possible to regulate the speed of the movement of the blade to conform to whatever speed the chain is moving by the station.

While we have described herein one embodiment of our invention, we wish it to be understood that we do not intend to limit ourselves thereby except within the scope of the claims hereto or hereinafter appended.

We claim:

1. A machine for removing the oil sac from a fowl carcass comprising a shaft, means to rotate the shaft, a knife carried by the shaft to rotate therewith, said knife having its part furthest from the shaft formed of two portions curved inwardly towards each other and coming together at the point most remote from the shaft forming a cutting member having a size slightly larger than the oil sac of a fowl.

2. A machine as claimed in claim 1 in which said portions are in the shape of parts of ovals.

3. A device as claimed in claim 2 in which said oval parts meet in a point.

4. A machine for removing the oil sac from a fowl carcass comprising a shaft, means to rotate the shaft, a disc carried by the shaft, a knife having leg portions secured on opposite faces of the disc and having extensions from said leg portions beyond the periphery of the disc, said extensions having outwardly and then inwardly curved parts and coming together at the point most remote from the shaft, the inwardly curved parts of said extensions having a size slightly larger than the oil sac of a fowl.

5. A machine for removing the oil sac from a fowl carcass comprising a shaft, means to rotate the shaft, a plurality of knives carried by the shaft to rotate therewith, all said knives being located between the same two planes transverse to the shaft and being angularly spaced around the shaft, each knife having its part furthest from the shaft formed of two portions curved inwardly towards each other and coming together at the point most remote from the shaft forming a cutting member having a size slightly larger than the oil sac of a fowl.

6. A machine for removing the oil sac from a fowl carcass comprising a shaft, means to rotate the shaft, a disc carried by the shaft, a plurality of knives carried by the disc and spaced angularly therearound, each knife having leg portions secured on opposite faces of the disc and having extensions from said leg portions beyond the periphery of the disc, said extensions being outwardly and then inwardly curved parts and coming together at the point most remote from the shaft, the inwardly curved parts of said extensions having a size slightly larger than the oil sac of a fowl.

7. A machine for removing the oil sac from a fowl carcass comprising a casing, a shaft extending into said casing, means to rotate the shaft, said casing including a wall located in a plane parallel to the shaft axis and having a slot therein with its longitudinal axis in a plane perpendicular to the shaft axis, and a knife carried by the shaft, to rotate therewith, said knife having its portion furthest from the shaft formed of two portions curved inwardly towards each other and coming together at the point most remote from the shaft forming a cutting member having a size slightly larger than the oil sac of a fowl, the distance of the inner ends of the inwardly curved portions from the shaft being substantially equal to the distance of the outer face of the wall from the shaft whereby said knives pass out of the casing through the slot when the shaft is rotated.

8. A machine for removing the oil sac from a fowl carcass comprising a casing, a shaft extending into said casing, means to rotate the shaft, a disc carried by the shaft within the casing, said casing including a wall located in a plane parallel to the shaft axis and having a slot therein with its longitudinal axis in a plane perpendicular to the shaft axis, a plurality of knives carried by the disc and spaced angularly therearound, each knife having leg portions secured on opposite faces of the disc and having extensions from said leg portions beyond the periphery of the disc, said extensions having outwardly and then inwardly curved parts and coming together at the point most remote from the shaft, the inwardly curved parts of said extensions having a size slightly larger than the oil sac of a fowl, said disc having a diameter substantially equal to the distance from the shaft axis to the wall, whereby said knives pass out of the casing through the slot when the shaft is rotated.

9. In combination with a conveyer for carrying fowl carcasses, a device for removing the oil sac from a fowl carcass comprising a shaft, means to rotate the shaft, a knife carried by the shaft to rotate therewith, said knife having its portion furthest from the shaft formed of two portions curved inwardly towards each other and coming together at the point most remote from the shaft forming a cutting member having a size slightly larger than the oil sac of a fowl.

10. In combination with a conveyor for carrying fowl carcasses, a device for removing the oil sac from a fowl carcass comprising a casing, a shaft extending into said casing, means to rotate the shaft, said casing including a wall located in a plane parallel to the shaft axis and having a slot therein with its longitudinal axis in a plane perpendicular to the shaft axis, and a knife carried by the shaft to rotate therewith, said knife having its portion furthest from the shaft formed of two portions curved inwardly towards each other and coming together at the point most remote from the shaft forming a cutting member having a size slightly larger than the oil sac of a fowl, the distance of the inner ends of the inwardly curved portions from the shaft being substantially equal to the distance of the outer face of the wall from the shaft whereby said knives pass out of the casing through the slot when the shaft is rotated, the path of movement of the knives being adjacent the path of the rear ends of fowl carried by the conveyer.

11. In combination with a conveyer for carrying fowl carcasses, a device for removing the oil sac from a fowl carcass comprising a casing, a shaft extending into the casing, mans to rotate said shaft, a disc carried by the shaft within the casing, said casing including a wall located in a plane parallel to the shaft axis and having a slot therein with its longitudinal axis in a plane perpendicular to the shaft axis, a plurality of knives carried by the disc and spaced angularly therearound, each knife having leg portions secured on opposite faces of the disc and having extensions from said leg portions beyond the periphery of the disc, said extensions having outwardly and then inwardly curved parts and coming together at the point most remote from the shaft, the inwardly curved parts of said extensions having a size slightly larger than the oil sac of a fowl, said disc having a diameter substantially equal to the distance from the shaft axis to the wall, whereby said knives pass out of the casing through the slot when the shaft is rotated, the path of movement of the knives being adjacent the path of the rear ends of fowl carried by the conveyer.

12. A device as claimed in claim 11 in which said wall is the top wall of the casing, the casing having a discharge opening in its bottom.

References Cited by the Examiner

UNITED STATES PATENTS

| | | | |
|---|---|---|---|
| 826,266 | 7/06 | Newman | 17—11 |
| 2,840,849 | 7/58 | Bergstrom et al. | 17—1 |
| 2,846,718 | 8/58 | Sengelaub et al. | 17—11 |
| 2,957,198 | 10/60 | Cianciolo et al. | 17—11 |

SAMUEL KOREN, *Primary Examiner.*

LUCIE H. LAUDENSLAGER, *Examiner.*